United States Patent
Abe et al.

(10) Patent No.: US 8,495,940 B2
(45) Date of Patent: Jul. 30, 2013

(54) TOOL UNITS FOR CUTTING DEVICES

(75) Inventors: Hideki Abe, Anjo (JP); Masahiko Miura, Anjo (JP)

(73) Assignee: Makita Corporation, Anjo-shi (JP)

( * ) Notice: Subject to any disclaimer, the term of this patent is extended or adjusted under 35 U.S.C. 154(b) by 449 days.

(21) Appl. No.: 12/320,726

(22) Filed: Feb. 3, 2009

(65) Prior Publication Data

US 2009/0193949 A1 Aug. 6, 2009

(30) Foreign Application Priority Data

Feb. 5, 2008 (JP) ................................. 2008-024950

(51) Int. Cl.
*B23D 47/00* (2006.01)
(52) U.S. Cl.
USPC ............................... 83/574; 83/471.3; 30/388
(58) Field of Classification Search
USPC .. 83/471.8, 478, 477.1, 574, 471.3; D15/133; 30/388–391
See application file for complete search history.

(56) References Cited

U.S. PATENT DOCUMENTS

| 3,447,577 | A | * | 6/1969 | Burrows et al. | 30/377 |
|---|---|---|---|---|---|
| 5,016,510 | A | * | 5/1991 | Gardner | 83/471.2 |
| D333,825 | S | * | 3/1993 | Price | D15/142 |
| 7,552,666 | B2 | * | 6/2009 | Liu et al. | 83/471.3 |
| 2001/0029819 | A1 | * | 10/2001 | Okouchi | 83/13 |
| 2002/0127960 | A1 | * | 9/2002 | Brazell | 451/280 |
| 2003/0024368 | A1 | * | 2/2003 | Fukuoka | 83/698.41 |
| 2005/0098011 | A1 | * | 5/2005 | Kao et al. | 83/490 |
| 2005/0155231 | A1 | * | 7/2005 | Hartmann et al. | 30/377 |
| 2006/0112804 | A1 | * | 6/2006 | Dils et al. | 83/581 |

FOREIGN PATENT DOCUMENTS

| JP | U-07-031302 | | 6/1995 |
|---|---|---|---|
| JP | A-10-151520 | | 6/1998 |
| JP | 2000025001 | * | 1/2000 |
| JP | A-2000-135624 | | 5/2000 |
| JP | A-2005-074861 | | 3/2005 |
| JP | A-2006-346909 | | 12/2006 |

OTHER PUBLICATIONS

Jul. 3, 2012 Notification of Reasons for Rejection issued in JP Application No. 2008-024950 w/translation.

* cited by examiner

*Primary Examiner* — Stephen Choi
(74) *Attorney, Agent, or Firm* — Oliff & Berridge, PLC

(57) ABSTRACT

A tool unit for a cutting device includes a rotary blade, a blade case for covering at least a part of the blade case, and a drive device mounted to the blade case for rotatably driving the rotary blade. A handle is attached to the drive device. The blade case has a front support portion. The handle has a rear support portion. When the tool unit is used for a portable cutting device, the front support portion can be vertically pivotally supported by a front portion of the base, and the rear support portion can be supported by a guide member such that a position of the rear support portion can be changed relative to the guide member for enabling adjustment of a cutting depth of the rotary blade into the workpiece. When the tool unit is used for a table cutting device, the front support portion can be vertically pivotally supported by the table.

14 Claims, 6 Drawing Sheets

FRONT SIDE ⟵⟶ REAR SIDE

RIGHT SIDE ← → LEFT SIDE

TOOL UNITS FOR CUTTING DEVICES

This application claims priority to Japanese patent application serial number 2008-4024950, the contents of which are incorporated herein by reference.

BACKGROUND OF THE INVENTION

Field of the Invention

The present invention relates to tool units for working devices, and in particular to tool units having rotary tools, such as circular saws, grinding wheels and chip saws, mounted thereto.

As wood-working or metal-working devices, table cutting devices and portable cutting devices are known. The table cutting devices include a table for placing thereon a workpiece, and a tool unit vertically tiltably supported on the table. The portable cutting devices include a base for placing on an upper surface of a workpiece, and a tool unit supported on the upper side of the base. The workpiece can be cut as the tool unit and the base are moved together along the workpiece in the state where a rotary cutting tool of the tool unit protrudes downward from the base.

Both of the table cutting device and the portable cutting device can be used for either a wood-working operation or a metal-working operation depending on the type of a workpiece to be cut. However, according to the table cutting device, the tool unit is supported on the table, on which a workpiece is placed, and the cutting operation is performed by moving the tool unit relative to and along the table. On the other hand, according to the portable cutting device, the tool unit is supported on the base that is adapted to be placed on a workpiece, and the cutting operation is performed by moving the tool unit and the base together relative to the workpiece. The basic construction of the table cutting device and that of the portable cutting device are different from each other in these points. Therefore, a supporting structure for supporting a blade case that covers the cutting tool of the table cutting device and that of the portable cutting device are also different from each other.

Thus, according to the support structure of the table cutting device, a front support member is disposed at one end of the blade case, and the tool unit is vertically pivotally supported on one end of the table via the front support member, so that the rotary blade cuts into a workpiece as the tool unit is pivoted downward.

On the other hand, according to the portable cutting device, a front support member is disposed at one end of the blade case, and the tool unit is vertically pivotally supported on one end of the base (a front end with respect to a cutting direction in many cases) via the front support member. This structure is basically the same as the support structure of the table cutting device. However, according to the support structure of the portable cutting device, the other end of the blade case is also supported on the base, so that the rotary blade cuts into a workpiece as the tool unit and the base move together. In the case of the portable cutting device, in order to adjust the cutting depth of the rotary blade into the workpiece, the tool unit can pivot vertically relative to the base, so that the downwardly protruding distance of the rotary blade from the lower surface of the base can be changed.

In this way, there has been provided two types of cutting devices (i.e., table cutting devices and portable cutting devices) used for different modes of cutting operations. The table cutting device and the portable cutting device are different in their detailed constructions but have some common construction in their tool units. For example, in both of the table cutting device and the portable cutting device, the tool unit has a circular cutting blade, a blade case covering substantially the upper half of the cutting blade, an electric motor as a drive source for rotatably driving the cutting blade, and a gear case for receiving therein a gear train for reducing the rotational output of the motor. In addition, in both of the table cutting device and the portable cutting device, the gear case and a motor case for receiving therein the motor are mounted to the backside of the blade case and are arranged in series with each other. Further, in the table cutting device or the portable cutting device, the tool unit is pivotally supported on the table or the base via the blade case.

The tool unit is supported on the table in the case of the table cutting device, while the tool unit is supported on the base in the case of the portable cutting device. Therefore, the tool units for the table cutting devices and the tool units for the portable cutting devices have been manufactured as components dedicated to the table cutting devices and components dedicated to the portable cutting devices, respectively.

Therefore, there has been a need for tool units that can be used for both of table cutting devices and portable cutting devices.

SUMMARY OF THE INVENTION

One aspect according to the present invention includes a tool unit having a drive device and a handle that can be used for both of a table cutting device and a portable cutting device. A blade case can be connected to the drive device and may be pivotally connected to a table of the table cutting device and a base of the portable cutting device. The handle can be connected to a pivoting position adjusting member mounted to a base of the portable cutting device.

DETAILED DESCRIPTION OF THE INVENTION

Each of the additional features and teachings disclosed above and below may be utilized separately or in conjunction with other features and teachings to provide improved tool units for working devices, such as cutting devices. Representative examples of the present invention, which examples Utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
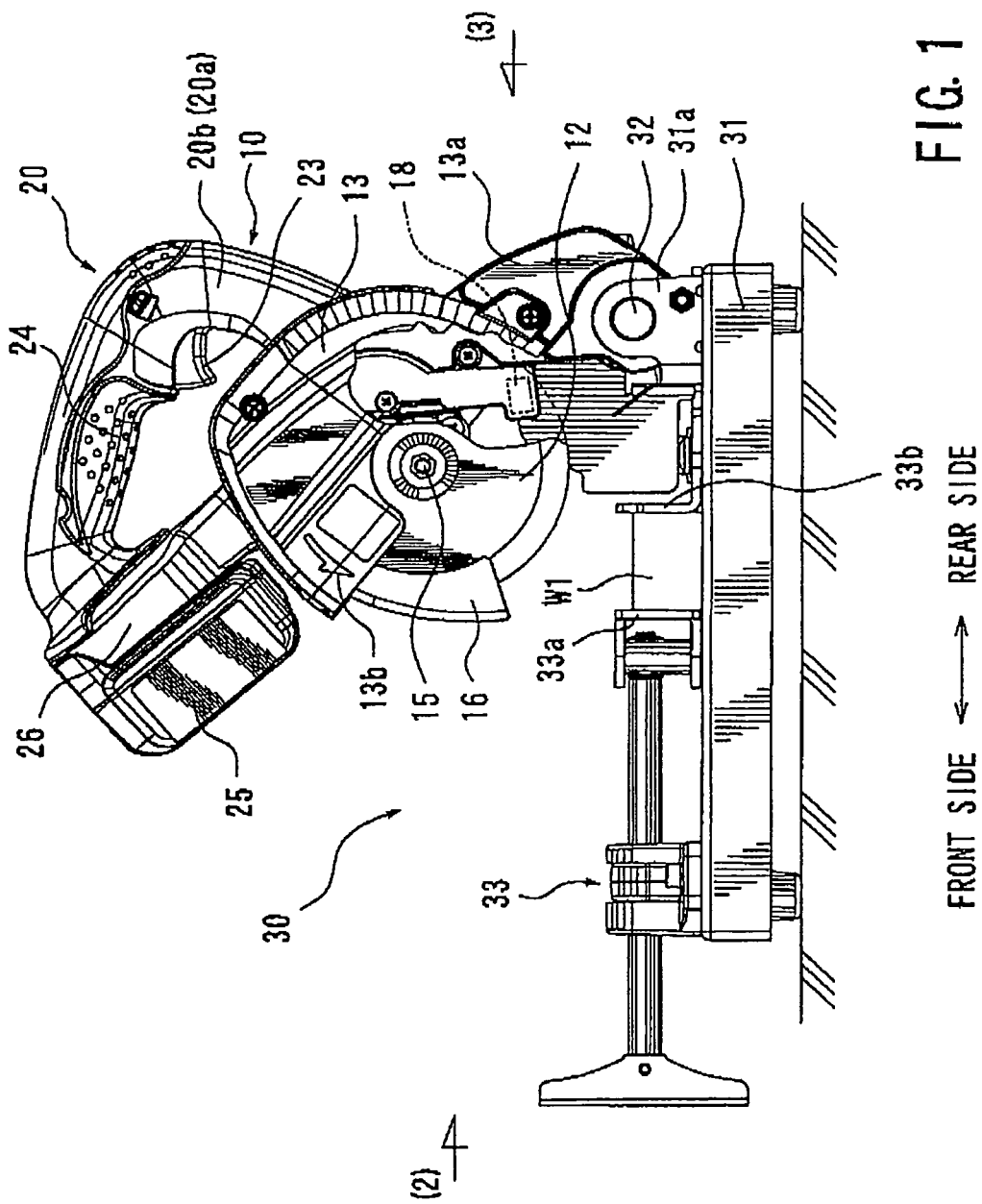
FIG. 1 is a right side view of a table cutting device incorporating a tool unit according to an embodiment of the present invention.

An embodiment of the present invention will now be described with reference to FIGS. 1 to 6. FIG. 1 shows a table cutting device 30 incorporating a tool unit 10 according to the embodiment. FIG. 6 shows a portable cutting device 50 incorporating a tool unit 60 that shares many of the components of the tool unit 10. In the case of the table cutting device 30, in order to operate the device 30, an operator may be positioned on a left side as viewed in FIG. 1. On the other hand, in the case of the portable cutting device 50, in order to operate the device 50, an operator may be positioned on the right side as viewed in FIG. 6. In this description, terms "a front side" and "a rear side" are used to mean a front side and a rear side as viewed from the side of the operator, respectively. Thus, the front side is a side toward the operator and the rear side is a side away from the operator. Also, terms "a right side" and "a left side" are used to mean a right side and a left side as viewed from the side of the operator. Therefore, the right side and the left side as viewed in FIG. 1 should be considered to be the front side and the rear side of the table cutting device 30, respectively. In addition, the left side and the right side as viewed in FIG. 3 should be considered to be the right side and the left side of the table cutting device 30, respectively. Further, the left side and the right side as viewed in FIG. 6 should be considered to be the front side and the rear side of the portable cutting device 50, respectively.

The tool unit 10 can be used for both of the table cutting device 30 and the portable cutting device 50. The table cutting device 30 includes a table 31, on which a workpiece W1 can be placed. The tool unit 10 is vertically pivotally supported on the table 31 at a position proximal to the front end of the table 31 via a support shaft 32. The operator can pivot the tool unit 10 downward from an uppermost position or a rest position in order to cut the workpiece W1.

A vice device 33 having a pressing plate 33a is mounted on the upper surface of the table 31, on which the workpiece W1 is placed, for fixing the workpiece W1 in position. A support plate 33b is fixedly mounted on the upper surface of the table 31 in a position opposed to the pressing plate 33a of the vice device 33. Therefore, the workpiece W1 can be clamped between the pressing plate 33a the support plate 33b so as to be fixed in position relative to the upper surface of the table 31 as shown in FIG. 1. A blade receiving groove (not shown) is formed in the upper surface of the table 31 in order to receive a part of a circular rotary blade 12 during a cutting operation.

Figure 2:
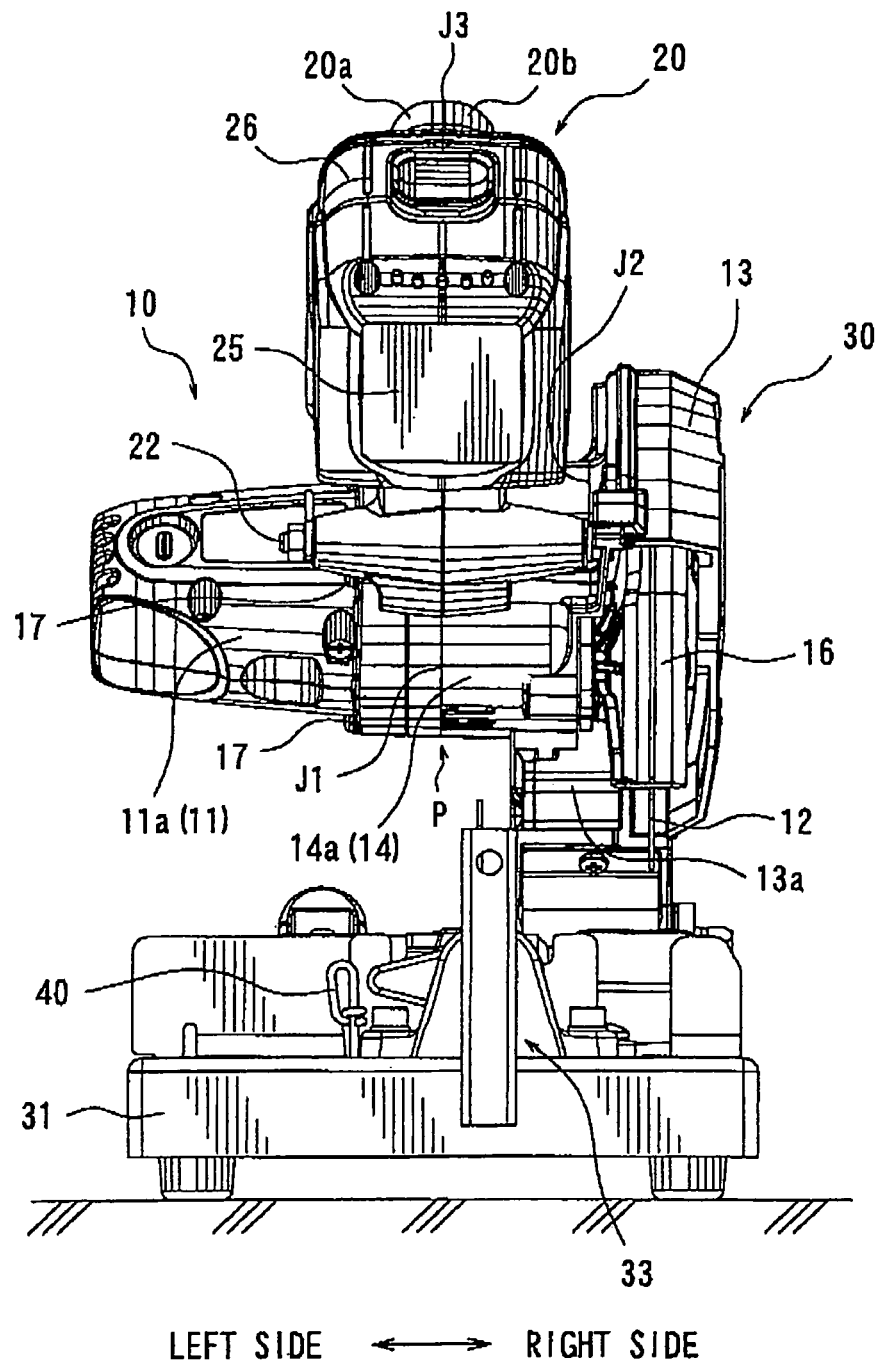
FIG. 2 is a rear view of the table cutting device as viewed in a direction indicated by an arrow (2) in FIG. 1.
Figure 3:
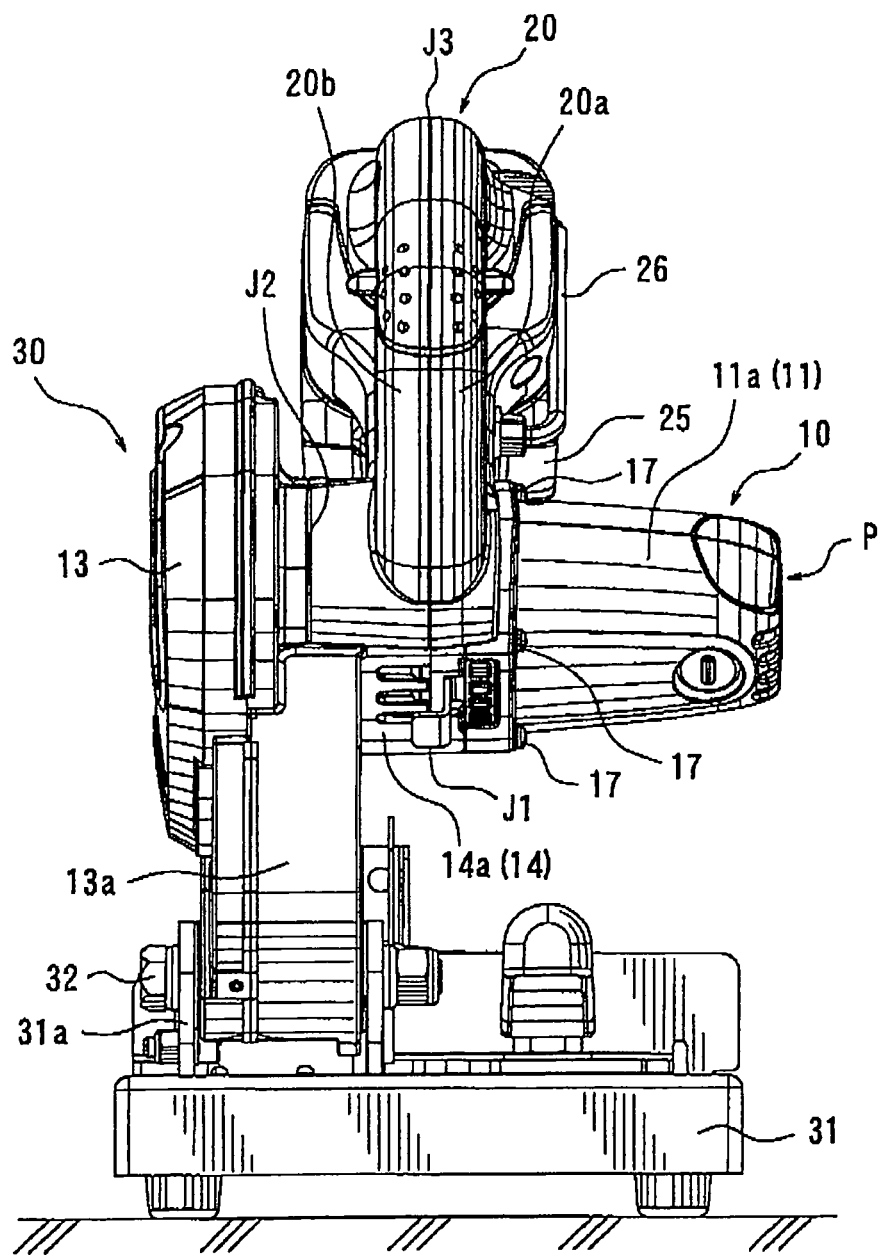
FIG. 3 is a front view of the table cutting device as viewed in a direction indicated by and arrow (3) in FIG. 3.
Figure 4:
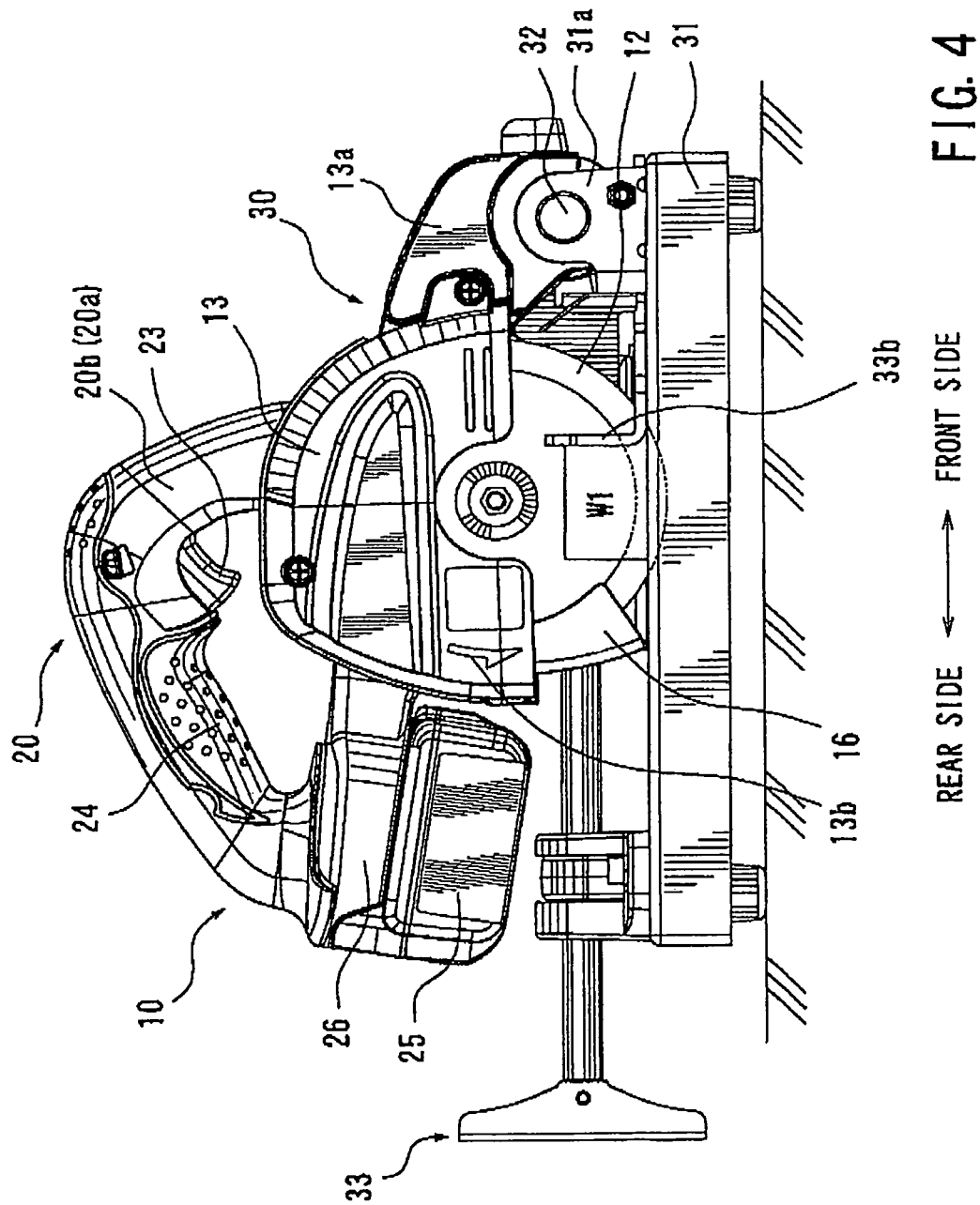
FIG. 4 is a right side view similar to FIG. 1 but showing the tool unit positioned at a lowermost position.

The tool unit 10 includes an electric motor 11, the rotary blade 12 rotatably driven by the motor 11, and a blade case 12 covering substantially an upper half of the rotary blade 12. The motor 11 is disposed on the rear side of the blade case 13 and is received within a motor case 11a. A gear mechanism 14 is coupled to the motor 11 and is disposed within a gear case 14a. As shown in FIGS. 2 and 3, the motor case 11a and the gear case 14a contact with each other at a contact plane J1 and extend in series with each other to have the same axis. In this embodiment, the motor 11 and the gear mechanism 14 (and the motor case 11a and the gear case 14a) constitute a drive device P for rotatably driving the rotary blade 12. The contact plane J1 may serve as a boundary plane between the drive section P and the backside part of the blade case 13. The motor case 11a and the gear case 14a are secured to the backside of the blade case 13 by using four fixing screws 17.

The rotation of the motor 11 is transmitted to a spindle 15 via the gear mechanism 14. The spindle 15 is rotatably supported by the blade case 13. The rotary blade 12 is mounted to an end portion of the spindle 15. As indicated by an outline arrow 13b in FIG. 1, the rotary blade 12 rotates in a counterclockwise direction as viewed from the right side of the blade case 13. In this embodiment, the rotary blade 12 is configured as a chip saw used for a metal working operation and having a plurality of hard chips, attached to the peripheral portion.

A movable cover 16 is supported on the blade case 13 and is rotatably supported by a bearing holder (not shown) that has a bearing received therein for rotatably supporting the spindle 15 relative to the blade case 13. The bearing holder is formed integrally with a right surface of the gear case 14a. The movable cover 16 can rotate between a close position and an open position for covering and uncovering a substantially lower half of the rotary blade 12, respectively. The movable cover 16 is opened to enter the blade case 13 as it rotates in a direction opposite to the rotational direction of the rotary blade 12.

More specifically, in response to the downward pivoting movement of the tool unit 10, the movable cover 16 is opened due to change of position of its gravity center relative to the center of rotation. The movable cover 16 may be opened also due to contact of its end portion with the upper surface of the workpiece W1. In this way, as the tool unit 10 moves downward, the movable cover 16 is opened to expose the lower half of the rotary blade 12, so that the exposed lower half of the rotary blade 12 can cut into the workpiece W1.

The tool unit 10 further includes a substantially loop-shaped handle 20 adapted to be grasped by the operator. The handle 20 is formed integrally with the motor case 11a and the gear case 14a and extends therebetween or between a front side and a rear side of the contact plane J1. The handle 20 includes handle halves 20a and 20b. The handle half 20a is formed integrally with the motor case 11a and the handle half 20b is formed integrally with the gear case 14a. The handle halves 20a and 20b are opposed to each other at the contact plane J1 and are joined to form the handle 20. In FIGS. 2 and 3, the handle halves 20a and 20b contact at a contact plane J3 that coincides with the contact plane J1.

Figure 5:
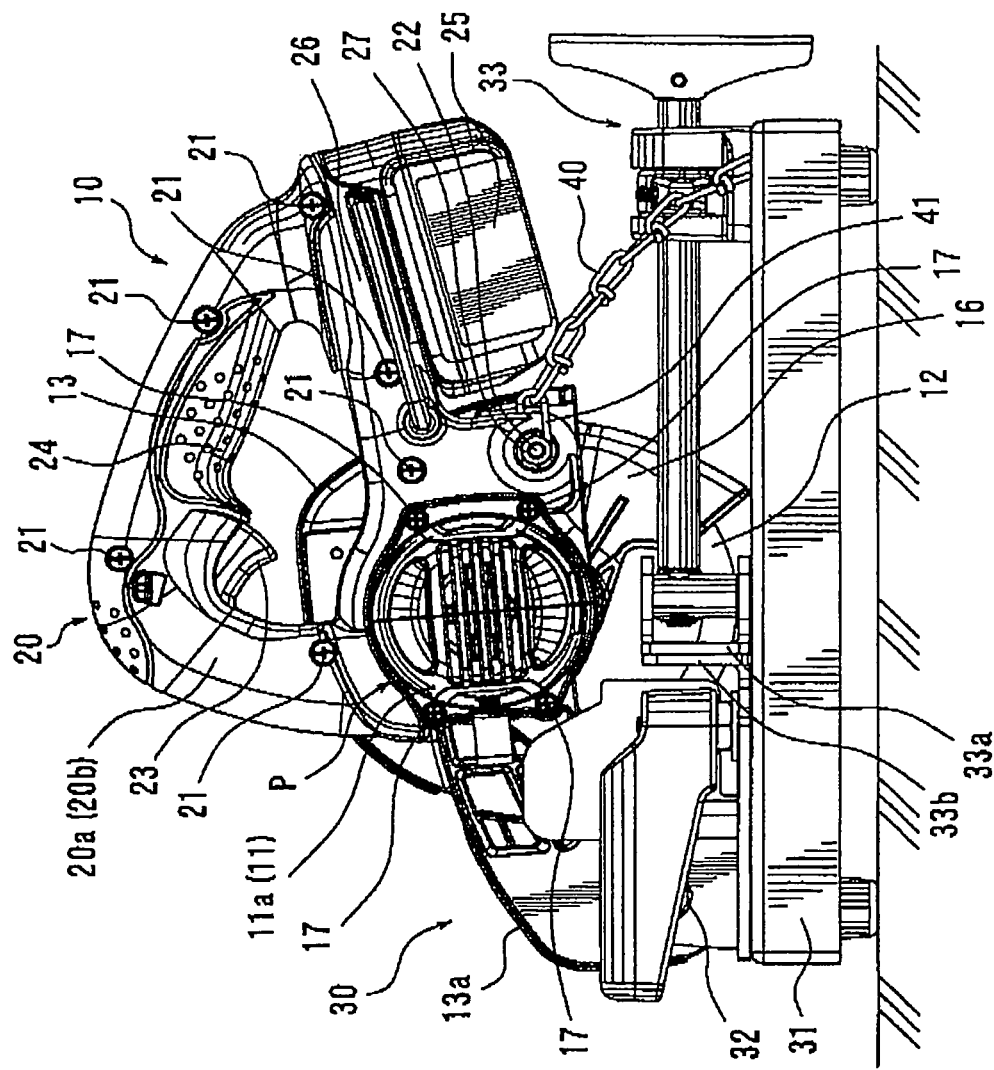
FIG. 5 is a left side view of the table cutting device and showing the tool unit positioned at the lowermost position.
Figure 6:
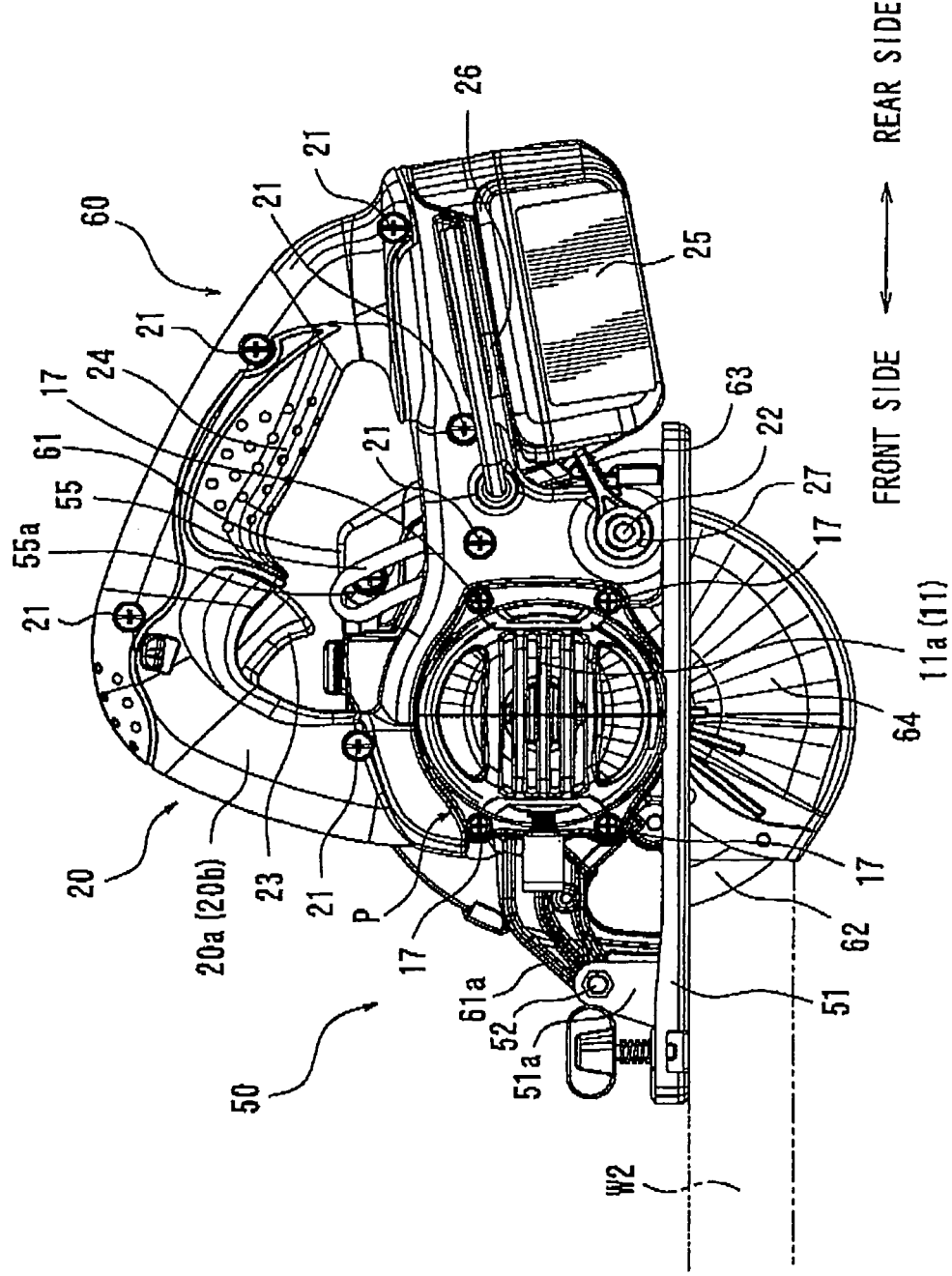
FIG. 6 is a left side view of a portable cutting device incorporating the tool unit according to the embodiment of the present invention.

As shown in FIG. 5, the handle halves 20a and 20b are fastened to each other by a plurality of fixing screws 21 and a single support bolt 22. Each of the fixing screws 21 is inserted into the handle half 20a and is threadably engaged with the handle half 20b. The support bolt 22 is inserted into both of the handle halves 20a and 20b at lower end portions (on the side of the table 31) lower than portions where the fixing screws 21 are inserted and threadably engaged. The support bolt 22 also serves as a mount for mounting a holding member 40 that is operable to hold the tool unit 10 at its lowermost position. Further, the support bolt 22 can serve as a rear side support that can support the rear side of the tool unit 60 of the portable cutting device 50 against a base 51 that will be explained later. A fixing nut 27 is threadably engaged with the support bolt 22. As the fixing nut 27 is tightened, the handle halves 20a and 20b are fastened to each other.

A trigger-type switch lever 23 is mounted on an upper portion of the inner circumferential surface of the handle 20. The handle 20 has a grip 24 positioned on the rear side of the switch lever 23. A battery pack 25 is mounted to the rear portion of the handle 20. More specifically, the battery pack 25 is inserted into a battery mount portion 26 that is formed on the rear portion of the handle 20 and has a lower opening. Within the battery mounting portion 26, the battery pack 25 can be slidably moved in forward and rearward directions to be locked and unlocked against the battery mounting portion 26. In this embodiment, as the battery pack 25 is slid forwardly, the battery pack 25 can be locked against the battery mounting portion 26. The battery pack 25 is unlocked against the battery mounting portion 26 as it is slid rearwardly relative to the battery mounting portion 26, so that the battery pack 25 can be removed from the battery mounting portion 26 for the purpose of recharging.

The battery pack 25 serves as a power source for supplying an electric power to the motor 11. The motor 11 is started to rotate the rotary blade 11 as the operator grasps the handle 20 at the grip 24 and pulls the switch lever 23 to move the switch lever 23 from an off position to an on position by his or her fingers. As the operator releases the switch lever 23, the switch lever 23 returns to the off position, so that the motor 1 is stopped.

In this way, according to this embodiment, the battery pack 25 having a relatively heavy weight is mounted to the rear portion of the handle 20, while the grip 24 to be grasped by the operator is positioned forwardly of the battery pack 25 and between the battery pack 25 and the motor 11 in plan view. Therefore, the weight balance with respect to the forward and rearward directions of the tool unit 10 can be improved, so that the operator's feeling during the pivoting operation of the tool unit 10 can be improved.

As shown in FIG. 1, a lighting device 18 is disposed within the blade case 13. In this embodiment, the lighting device 18 is an LED (light emitting diode) and receives the supply of power from the battery pack 25 (more specifically rechargeable battery cells mounted within the battery pack 25). The lighting device 18 is configured such that it is switched on and off as the switch lever 23 is pulled and released, respectively.

The lighting device 18 is positioned forwardly of the center of rotation of the rotary blade 12 (i.e., the rotational axis of the spindle 15) and on the backside of the rotary blade 12 with respect to the direction of thickness of the rotary blade 12 (i.e., the left side as viewed from the side of the operator), so that the lighting device 18 is positioned within a space between the blade case 132 and the rotary blade 12.

with this specific arrangement of the lighting device 18, a portion of the workpiece W1 that is cut by the rotary blade 12 can be illuminated by the light from a position forwardly and obliquely upward of the cut portion during the cutting operation performed by downwardly pivoting the tool unit 10. Therefore, even if the cutting operation is performed in a dark workplace, the operator can easily observe the cut portion, so that the cutting operation can be effectively performed.

An electrical wiring line (not shown) extending from the lighting device 18 and an electrical wiring line (not shown) extending from the battery pack 25 are connected to each other by connectors at a position within or proximal to the contact plane J2 between the blade case 13 and the gear case 14. Therefore, in the case that the blade case 13 and the gear case 14 are separated from each other at the contact plane J2, the electrical wiring lines of the lighting device 18 and the battery pack 25 can be easily separated from each other by disconnecting the connectors. On the other hand, in the case that the blade case 13 and the gear case 14 are joined to each other, the electrical wiring lines of the lighting device 18 and the battery pack 25 can be easily connected to each other by connecting the connectors.

As described previously, the tool unit 10 is vertically pivotally supported on the table 31 via the support shaft 31. More specifically, a front support portion 13a is formed integrally with a front portion of the blade case 13 and is rotatably mounted to a support bracket portion 31a via the support shaft 32. The support bracket portion 31a is provided on a front portion of the upper surface of the table 31. A torsion spring (not shown) biases the tool unit 10 toward an uppermost position or a rest position. Therefore, the operator presses the tool unit 10 downward against the biasing force of the torsion spring in order to cut the workpiece W1.

As shown in FIG. 5, the tool unit 10 can be held at the lowermost position by means of the holding member 40. As described previously, the handle 20 has the handle halves 20a and 20b, and the support bolt 22 connects the lower end portions of the handle halves 20a and 20b to each other. A hook 41 is attached to the support bolt 22. In other words the hook 41 is attached to the lower portion of the handle 20 via the support bolt 22. In this embodiment, the holding member 40 is a chain and has one end hung on the hook 41. The other end of the holding member 40 is connected to a rear portion of the upper surface of the table 31. In order to hang the one end of the holding member 40 on the hook 41, the operator may hold the tool unit 10 at the lowermost position against the biasing force of the torsion spring. After that, the operator may release the holding force, so that the tool unit 10 can be held in the lowermost position without need of applying the downwardly pressing force by the operator. With the tool unit 10 thus held in the lowermost position, the height of the entire cutting device 30 can be lowered, so that the cutting device 30 becomes compact with respect to the size in a direction of its height. Therefore, a storage space necessary for storing the cutting device 30 can be reduced. In addition, the operator can easily carry the cutting device 30 by grasping the grip 24 of the handle 20.

Referring to FIG. 6, there is shown the portable cutting device 50 that includes a base 51, on which a workpiece W2 is placed, and a tool unit 60 supported on the base 51. The same components as the primarily components, such as the motor 11, the gear mechanism 14 and the handle 20 of the tool unit 10 of the table cutting device 30 art also used as the primary components of the tool unit 60. Therefore, in FIG. 6, the same components as the components of the tool unit 10 are labeled with the same reference numerals.

The tool unit 60 has a blade case 61. The motor case 11a for receiving the motor 11 and the gear case 14a for receiving the gear mechanism 14 are mounted to the backside of the blade case 61 by means of four screws 17. Similar to the blade case 13 of the table cutting device 30, the blade case 61 covers a substantially upper half of a rotary blade 62 and has a front support portion 61a that corresponds to the front support portion 13a of the table cutting device 30 but is small in size and thickness in comparison with the front support portion 13a.

In the case of the table cutting device 30, the tool unit 10 having a relatively heavy weight is supported on the table 31 in a cantilever manner at only one position via the front support portion 13a. Therefore, the front support portion 13a is designed to have a relatively large size and thickness in order to ensure the rigidity. In contrast, the tool unit 60 of the portable cutting device 50 is supported on the base 51 at front and rear positions. Therefore, the size and thickness of the front support portion 61a can be designed to be smaller than those of the front support portion 13a.

The front support portion 61a is vertically pivotally supported by a support bracket 51a via a support shaft 52. The support bracket 51a is provided on the front portion of the upper surface of the base 51. A guide member 55 called "depth guide" is provided on the rear portion of the upper surface of the base 51 and extends vertically upward therefrom. A guide slot 55a is formed in the guide member 55 and extends in the longitudinal direction of the guide member 55.

The guide slot 55a has a configuration of a substantially arc-shape about the support shaft 52. The bolt 22 (that is inserted into the lower end portion of the handle 20 and extends through the handle halves 20a and 20b) is inserted into the guide slot 55a. The fixing nut 27 is engaged with the bolt 22, so that the rear portion of the tool unit 60 can be fixed in position relative to the rear portion of the base 51 by tightening the fixing nut 27. In this way, the support bolt 22 serves as a rear support member for supporting the rear portion of the tool unit 60.

A fixing lever 63 is mounted to the fixing nut 27, so that the fixing nut 27 can be rotated by the operation of the fixing lever 63. Therefore, as the fixing lever 63 is pivoted in a loosening direction (counterclockwise direction as viewed in FIG. 6), the fixing nut 27 is loosened to permit movement of the support bolt 22 along the guide slot 55a, so that the tool unit 60 can pivot vertically about the support shaft 52. On the other hand, as the fixing lever 53 is pivoted in a tightening direction (clockwise direction as viewed in FIG. 6), the fixing nut 27 is tightened to fix the support bolt 22 in position relative to the guide slot 55a, so that the tool unit 60 can be fixed in position with respect to the pivoting direction.

By changing the position of the tool unit 60 with respect to the pivoting direction, it is possible to change a protruding distance of the rotary blade 62 downwardly from the lower surface of the base 51, so that a cutting depth of the rotary blade 62 into the workpiece W2 can be changed. Hence, loosening the fixing nut 27 by the operation of the fixing lever 63 enables to change the position of the tool unit 60 with respect to the pivoting direction and eventually enables to change the cutting depth of the rotary blade 62.

In this embodiment, similar to the rotary blade 12 of the table cutting device 30, the rotary blade 62 is configured as a chip saw used for a metal working operation and having a plurality of hard chips attached to the peripheral portion. Therefore, the portable cutting device 50 is configured as a battery-driven chip saw cutter used mainly for a metal working operation.

Also, similar to the table cutting device 30, a movable cover 64 can move into and out of the blade case 61 and is rotatably supported by the bearing holder that is formed integrally with the right surface of the gear case 14a, so that the exposed lower half of the rotary blade 62 can be covered and uncovered by the movable cover 64. As the cutting device 50 moves along the workpiece W2, the movable cover 64 contacts an end portion of the workpiece W2, so that the movable cover 64 is pushed by the end portion of the workpiece W2 so as to be opened.

As described above, according to the portable cutting device 50 (battery-driven chip saw cutter), the tool unit 60 may have the motor 11, the gear mechanism 14 and the handle 20 that are the same components as the tool unit 10 of the table cutting device 30. Here, the motor 11, the gear mechanism 14 and the handle 20 are mounted to the backside of the blade case 13 (61).

Further, the rotary blade 62, the spindle 15, to which the rotary blade 62 is mounted, and the bearing holder having the bearing for rotatably supporting the spindle 15 of the portable cutting device 50 may be the same components as the rotary blade 12, the spindle 15 and the bearing holder of the table cutting device 30, respectively.

Furthermore, the portable cutting device 50 also may have the lighting device 18 (not shown in FIG. 6). Thus, the lighting device 18 may be positioned forwardly of the center of rotation of the rotary blade 62 (i.e., the rotational axis of the spindle 15) and on the backside of the rotary blade 62 with respect to the direction of thickness of the rotary blade 62 (i.e., the left side as viewed from the side of the operator), so that the lighting device 18 may be positioned within a space between the blade case 13 and the rotary blade 62 in order to illuminate a cut portion of the workpiece W2 by the light from a position forwardly and obliquely upward of the cut portion.

Furthermore, the portable cutting device 50 may further include an electrical wiring line (not shown) extending from the lighting device 18 and an electrical wiring line (not shown) extending from the battery pack 25. The electrical wiring lines may be connected to each other by connectors at a position within or proximal to the contact plane J2 between the blade case 61 and the gear case 14. Therefore, the lighting device 18 is switched on and off as the switch lever 23 is pulled and released, respectively As described above, according to this embodiment, the tool unit 60 of the portable cutting device 50 shown in FIG. 6 can be used as the tool unit 10 of the table cutting device 30 by separating the motor case 11a and the gear case 14a (including the motor 11 and the gear mechanism 14) and the handle 20 from the blade case 61 and the base 51 and by assembling the blade case 13 and the table 31 the separated components. Thus, the motor case 11a and the gear case 14a (including the motor 11 and the gear mechanism 14) and the handle 20 can be used commonly for the tool units 10 and 60. In addition, the motor case 11a and the gear case 14a (including the motor 11 and the gear mechanism 14) and the handle 20 can be assembled as a unit before they are used for the tool unit 10 or 60. Therefore, the manufacturing costs of the table cutting device 30 and the portable cutting device 50 can be minimized. In addition, it is possible to easily perform maintenance for the table cutting device 30 and the portable cutting device 50.

In addition, the rear support member (the support bolt 22 in the above embodiment) can be used as a support member that is supported by the guide member 55 for adjusting the cutting depth in the case of the portable cutting device 50, while the rear support member can be used as an attaching member, to which the holding member 40 for holding the tool unit 10 in the lowermost position can be hung or attached, in the case of the table cutting device 30.

Further, the spindle 15 and the bearing holder formed integrally with the right surface of the gear case 14a and having the bearing received therein for rotatably supporting the spindle 15 can be commonly used for the table cutting device 30 and the portable cutting device 50. Therefore, by using a chip saw as the rotary blade 12 (62), the table cutting device 30 and the portable cutting device 50 can be used for a metal working operation.

Furthermore, the lighting device 18 disposed within the blade case 13 (61) can be used for illuminating the cut portion during the cutting operation by the rotary blade 12(62) both in the cases of the table cutting device 30 and the portable cutting device 50.

Furthermore, the electric wiring lines for the lighting device 18 and the connectors for connecting the electric wiring lines can be used commonly for the table cutting device 30 and the portable cutting device 50.

The present invention may not be limited to the above embodiment but may be modified in various ways. For example, although each of the cutting devices 30 and 50 has the battery pack 25 as a DC power source mounted to the rear portion of the handle 20, the present invention can be applied to a cutting device that utilizes an AC power source as a power source for driving a motor.

In addition, although the cutting devices 30 and 50 have rotary blades 12 and 62 that are configured as chip saws for metal working, the rotary blades may be saw blades for wood working or grinding wheels for stone working.

This invention claims:

1. A tool unit that is configured to be used as a portable cutting device and also as a table cutting device, comprising:
a rotary blade;
a first blade case configured to cover at least a part of the rotary blade and has a first front support portion;
a second blade case configured to cover at least a part of the rotary blade and has a second front support portion that is smaller in size and thickness than the first front support portion;
a drive device mounted to a backside of either the first blade case or the second blade case and configured to rotatably drive the rotary blade; and
a handle attached to the drive device; wherein:
the first front support portion is configured to be attached to a base of the portable cutting device, and the second front support portion is configured to be attached to a table of the table cutting device,
the handle has a rear support portion, the rear support portion is configured to be supported by a guide member of the base such that a position of the rear support portion is configured to be changed relative to the guide member for enabling adjustment of a cutting depth of the rotary blade into the workpiece.

2. The tool unit as in claim 1, wherein the rear support portion is used as a holding member attaching portion, to which a holding member for holding the tool unit at a lowermost position is attached.

3. The tool unit as in claim 1, wherein:
the drive device comprises, a motor, a gear mechanism and a motor and gear case configured to receive the motor and the gear mechanism therein;
the rotation of the motor is transmitted to the rotary blade via the gear mechanism, and
the motor and gear case is coupled to the first blade case or the second blade case; and
the handle is attached to the motor and gear case.

4. The tool unit as in claim 3, wherein
the drive device further includes a spindle coupled to the gear mechanism and rotatably supported by the motor and gear case; and
the rotary tool is mounted to the spindle.

5. The tool unit as in claim 1 further comprising a lighting device disposed within the first blade case and the second blade case and configured to illuminate a portion of the workpiece.

6. A tool unit comprising:
a motor;
a rotary working tool coupled to the motor via a gear mechanism, so that the rotary working tool can rotate as the motor is driven;
a first case configured to receive the motor and the gear mechanism therein;
a second case comprising a first blade case configured to cover at least a part of the rotary working tool and has a first connecting portion and a second blade case configured to cover at least a part of the rotary working tool and has a second connecting portion that is smaller in size and thickness than the first connecting portion; wherein the second case is removably coupled to the first case; and
a handle mounted to the first case;
wherein the handle includes handle halves and a coupling device comprising a bolt and a nut configured to couple the handle halves to each other, and
the first connecting portion is configured to be attached to a base of a portable cutting device and the second connecting portion is configured to be attached to a table of a table cutting device, on which a workpiece is placed.

7. A cutting device comprising:
the tool unit as in claim 6 and the table,
wherein the rotary working tool is a cutting blade;
wherein the second connecting portion is pivotally connected to the table, so that the tool unit can pivot vertically relative to the table, and
a holding device coupled between the coupling device and the table, so that the tool unit is held at a lowermost pivoted position.

8. A portable cutting device comprising:
the tool unit as in claim 6 and the base;
wherein the rotary working tool is a cutting blade;
wherein the first connecting portion is pivotally connected to the base, so that the tool unit can pivot vertically relative to the base, and
a support member mounted to the base and connected to the coupling device such that a connecting position of the coupling device to the support member is configured to be adjusted.

9. The tool unit as defined in claims 6, wherein
the first case extends along an axial direction, and
the handle extends radially outward from the first case.

10. The tool unit as in claim 9, wherein
the first case includes a motor case for receiving the motor and a gear case for receiving the gear mechanism, and
one of the handle halves is formed integrally with the motor case and the other of the handle halves is formed integrally with the gear case.

11. The tool unit as in claim 9, further comprising the second case disposed at one end with respect to the axial direction of the first case, the second case being configured to receive the rotary working tool therein.

12. The tool unit as in claim 11, wherein the second case is configured to be pivotally connected to the base and to be also pivotally connected to a table on which a workpiece is placed.

13. The tool unit as in claim 6, wherein the base includes a support bracket having a guide slot, and the bolt extends through the guide slot.

14. The tool unit as in claim 6, wherein the coupling device couples the handle to the base placed on a workpiece and when the handle is coupled to the base, the bolt extends through the handle halves and through a part of the base.

* * * * *